(12) United States Patent
Scott

(10) Patent No.: US 10,723,612 B2
(45) Date of Patent: Jul. 28, 2020

(54) METHOD FOR TRANSFERRING VOLATILE LIQUIDS

(71) Applicant: Steven Richard Scott, Curlew, WA (US)

(72) Inventor: Steven Richard Scott, Curlew, WA (US)

(73) Assignee: Motion Pro, Inc., Loomis, CA (US)

( * ) Notice: Subject to any disclaimer, the term of this patent is extended or adjusted under 35 U.S.C. 154(b) by 123 days.

(21) Appl. No.: 16/138,215

(22) Filed: Sep. 21, 2018

(65) Prior Publication Data

US 2019/0031494 A1    Jan. 31, 2019

Related U.S. Application Data

(63) Continuation of application No. 15/449,986, filed on Mar. 5, 2017, now Pat. No. 10,259,700.

(51) Int. Cl.
| | |
|---|---|
| *B67D 7/04* | (2010.01) |
| *B67D 7/00* | (2010.01) |
| *B67D 7/54* | (2010.01) |
| *F16K 17/00* | (2006.01) |
| *F16K 31/528* | (2006.01) |
| *F16K 15/02* | (2006.01) |
| *F16K 17/04* | (2006.01) |
| *F16K 27/02* | (2006.01) |

(52) U.S. Cl.
CPC ........... *B67D 7/0478* (2013.01); *B67D 7/005* (2013.01); *B67D 7/54* (2013.01); *F16K 15/026* (2013.01); *F16K 17/00* (2013.01); *F16K 17/042* (2013.01); *F16K 27/0209* (2013.01); *F16K 31/528* (2013.01)

(58) Field of Classification Search
CPC ...... B67D 7/0478; B67D 7/04; B67D 7/0476; B67D 7/06; B67D 7/005; B67D 7/54; F16K 15/026; F16K 17/00; F16K 17/0413; F16K 17/042; F16K 27/0209; F16K 31/528
See application file for complete search history.

(56) References Cited

U.S. PATENT DOCUMENTS

| | | | | |
|---|---|---|---|---|
| 4,031,930 A | * | 6/1977 | Sutcliffe | B67D 7/48 141/207 |
| 4,121,635 A | * | 10/1978 | Hansel | B67D 7/54 141/207 |
| 4,157,104 A | * | 6/1979 | Lofquist, Jr. | B67D 7/54 141/292 |

(Continued)

*Primary Examiner* — Nicolas A Arnett
(74) *Attorney, Agent, or Firm* — Larry B. Guernsey; Patent Law Office of Larry Guernsey

(57) ABSTRACT

A method for transferring volatile liquid from a refueling tank to the fuel tank of an internal combustion device including the steps of providing a volatile liquid refueling apparatus, having a probe including an outer collar and a receiver including a receiving collar, where the outer collar and the receiving collar are configured to join to create a vapor-tight enclosure, installing the receiver in the fuel tank of an internal combustion device, installing the probe in the refueling tank, inserting the probe into the receiver, engaging the receiving collar and the probe outer collar to create a vapor-tight enclosure, transferring volatile liquid from the refueling tank to the fuel tank, and disengaging the probe from the receiver, including sealing the refueling tank and the tank.

4 Claims, 11 Drawing Sheets

(56) References Cited

U.S. PATENT DOCUMENTS

| | | | | |
|---|---|---|---|---|
| 4,235,263 A * | 11/1980 | Lake, Jr. | | B62J 35/00 |
| | | | | 141/1 |
| 6,506,513 B1 * | 1/2003 | Yonetsu | | H01M 8/04186 |
| | | | | 429/448 |
| 6,713,201 B2 * | 3/2004 | Bullock | | H01M 8/04 |
| | | | | 347/7 |
| 7,766,039 B2 * | 8/2010 | Zuck | | F16L 37/127 |
| | | | | 137/614.04 |
| 7,798,184 B2 * | 9/2010 | Schultz, Jr. | | F16L 29/04 |
| | | | | 141/293 |
| 8,453,685 B2 * | 6/2013 | Schultz, Jr. | | F16L 29/04 |
| | | | | 137/614.04 |
| 8,776,843 B2 * | 7/2014 | Komiya | | B65B 3/04 |
| | | | | 141/93 |
| 9,534,621 B2 * | 1/2017 | Brown | | F16L 37/18 |
| 9,534,735 B2 * | 1/2017 | Pitney | | F17C 5/06 |
| 10,259,700 B2 * | 4/2019 | Scott | | F16K 31/528 |
| 2004/0209142 A1 * | 10/2004 | Becerra | | H01M 8/04082 |
| | | | | 141/349 |
| 2005/0051220 A1 * | 3/2005 | Tilling | | F16L 29/04 |
| | | | | 137/614.04 |
| 2005/0084722 A1 * | 4/2005 | Bullock | | H01M 8/04208 |
| | | | | 429/462 |
| 2005/0255361 A1 * | 11/2005 | Saito | | H01M 8/0278 |
| | | | | 429/508 |
| 2006/0006108 A1 * | 1/2006 | Arias | | H01M 8/04208 |
| | | | | 210/232 |
| 2006/0078770 A1 * | 4/2006 | Takahashi | | H01M 8/04186 |
| | | | | 429/449 |
| 2006/0260715 A1 * | 11/2006 | Muller | | H01M 8/04201 |
| | | | | 141/355 |
| 2013/0327439 A1 * | 12/2013 | Pitney | | F17C 5/06 |
| | | | | 141/346 |
| 2016/0347603 A1 * | 12/2016 | Zammit | | B67D 7/428 |
| 2018/0251364 A1 * | 9/2018 | Scott | | F16K 15/026 |
| 2018/0251365 A1 * | 9/2018 | Scott | | B67D 7/54 |
| 2019/0256342 A1 * | 8/2019 | Scott | | B67D 7/005 |

* cited by examiner

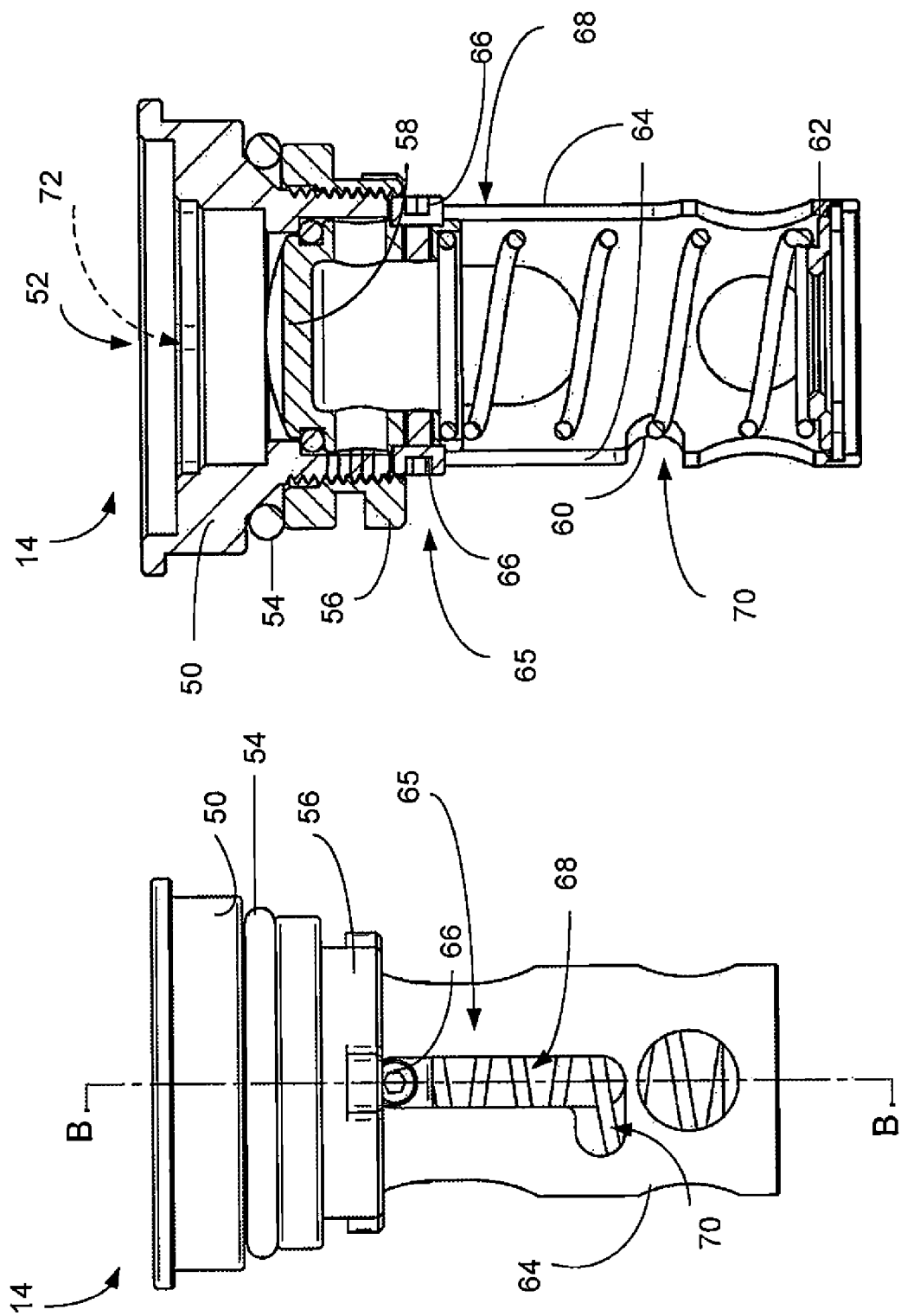

METHOD FOR TRANSFERRING VOLATILE LIQUIDS

This application is a Continuation of and claims priority to co-pending parent application Ser. No. 15/449,986 filed Mar. 5, 2017 and Ser. No. 15/710,113 filed Sep. 20, 2017 by the same inventor.

TECHNICAL FIELD

The present invention relates generally to a method for using devices for refueling mechanical engines.

BACKGROUND ART

There are several situations in which motorized equipment operates using a supply of volatile fuel such as gasoline or kerosine. When equipment must be operated continuously in order to function properly, there is a need to replenish the supply of fuel quickly, safely, and possibly while the motorized equipment continues to function uninterrupted.

One such example of this kind of situation is when gasoline-powered chain saws are used to cut away brush and foliage during a forest fire, in order to create fire breaks. When a fire-fighter needs to refuel his saw, while acting in a dangerous environment with open flames near at hand, it is extremely crucial that transfer of flammable fuel is conducted in an extremely safe manner. Since gasoline is notoriously volatile, it is extremely important that refueling operations do not allow the release of volatile vapors that can ignite with potentially deadly consequences. Thus there is a need for an apparatus and method that can transfer volatile fluids in a manner which contains flammable vapors from the fuel as it is being transferred to the operating saw.

During operation in firefighting, the fuel tanks in gasoline powered saws such as Stihl saws build up excess pressure due to heat. The fuel tanks and caps in these saws are not capable of venting this excess pressure and when the cap is opened during the fueling process, fuel vapor is released under pressure causing a severe safety hazard. A method of safely relieving the pressure buildup inside the fuel tank before the cap is opened is necessary.

Gasoline powered chainsaws require fuel to operate. Normally fueling is done as follows:

Remove cap on saw gas tank;

Remove seal cap on portable fuel container and install safety spout;

Lift portable fuel container and insert safety spout into chainsaw fuel tank;

When gas starts to overflow from chainsaw tank, remove spout to stop dispensing gasoline;

Reinstall gas cap on chainsaw; and

Remove safety spout from portable fuel container and reinstall seal cap.

This method requires many steps during which vapors from the fuel tank and refueling tank are open to the air and to any sparks or other conditions which may expose these vapors to possible explosion. It is also slow to implement in emergency conditions during which each second may be of crucial importance. The persons using this method may be exposed to considerable stress which may be distracting. Clearly, the simpler the method, the better, while in emergency conditions.

Further disadvantages of this prior art system are that in the course of refueling a hot chainsaw under existing conventional means, the operator has to remove that cap of chainsaw. In many cases, the fuel in the tank of the chainsaw is heated above its boiling point and the tank has become pressurized. When this happens and the cap is opened, it can cause fuel to spray out under pressure which has resulted in numerous reports of serious burns to chainsaw operators and a high risk of injury. This process also releases huge amounts of fuel vapor into the atmosphere. In addition, the conventional fueling method required time consuming process of removing and replacing caps, potential for portable fuel container to be spill fuel if knocked over accidentally, and continuous release of fuel vapor into the atmosphere during the refueling process. Just the release of fuel vapor during the refueling process created a health hazard and risk of fire and injury to the user and surrounding property. In addition, if an operator drops the chainsaw and/or fuel tank during the refueling process (for example if sprayed with fuel, accidentally drop, or emergency occurs) fuel will spill out of both the chainsaw tank and the open portable fuel container.

What is needed is a system and method that will eliminate the need for fuel or vapor to be exposed to the atmosphere during the refueling process. This method of refueling is called a "vapor-tight system". The basic system works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast a vapor-tight system is sealed. Once the fuel probe and the fuel tank are connected, fluid is simply exchanged from one to the other.

The method disclosed in this invention using this system of components provides a vapor-tight enclosure while provide a quicker, more secure and less dangerous means of transferring fuel under hazardous conditions.

The system used in this method comprises two parts, a receiver that permanently replaces the gas cap on the chainsaw fuel tank and a probe that permanently replaces the seal cap and safety spout normally used on portable fuel containers. In general terms, once the receiver and probe are in place, it is used as follows:

1) Pick up portable fuel container and insert probe into receiver on the chainsaw.
2) While probe is fully engaged into receiver on chainsaw, hold portable fuel container above saw for 10 seconds or until fuel stops flowing. Tank is now full.

Thus, there is a need for a volatile liquids refueling apparatus which contains volatile fuel vapors during refueling operations and a method of working.

DISCLOSURE OF INVENTION

Briefly, one preferred embodiment of the present invention is a volatile liquids refueling apparatus and method of working.

An advantage of the present invention is that it contains volatile vapors as fuel is transferred.

Another advantage is that the apparatus of the present invention can be locked in either the open position so the user can fill or empty the tank without the use of the probe if necessary, using the chainsaw bar tool or screwdriver, or in the closed position, to prevent spillage during transport.

A further advantage of the present invention is that the receiver uses a tube design with a single spring, thus reducing the cost of manufacturing and greatly simplifying the design.

Another advantage of the present invention is that the apparatus can be installed using a standard chain saw bar tool instead of multiple bolts to secure and seal it to the tank. The probe is designed to be attached to a standard SIG fuel bottle (camping fuel bottle). The probe can be installed on the fuel bottle without the use of tools by incorporating a grip onto the adaptor.

Yet another advantage of the present invention is that the typical tank of a chain saw can be filled in less than 15 seconds from empty to full.

Another advantage of the present invention is that it works on a fluid exchange principle, instead of a displacement principle.

A yet further advantage of the present invention is that the inclusion of springs in the probe and the receiver of the system add an additional level of safety in the field because if the device being fueled and the fuel bottle are dropped in an emergency situation (for example running from sudden fire surge or falling tree limb) the springs will act to automatically disengage the fuel bottle from the device being fueled and close themselves off, and thereby prevent accidental fuel spill and potential for a dangerous flammable fuel spill. Existing devices do not have this feature and will not necessarily disengage if the user drops them or stops putting pressure on the filler side to hold it into the receiver side. This feature adds a significant level of added safety when the device is being used in a firefighting scenario or other situation where a fuel spill could pose extreme danger to the user and anybody close by.

Also, an advantage of the present method is that it is a much simpler way of simply transferring fuel, which is less confusing and easier to enact under emergency circumstances.

These and other advantages of the present invention will become clear to those skilled in the art in view of the description of the best presently known mode of carrying out the invention of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 5A shows a receiver portion of the present invention;

FIG. 5B shows a cut-away view of the receiver of the present invention as taken through line B-B of FIG. 5A;

DETAILED DESCRIPTION OF THE PREFERRED EMBODIMENTS

Figure 1:
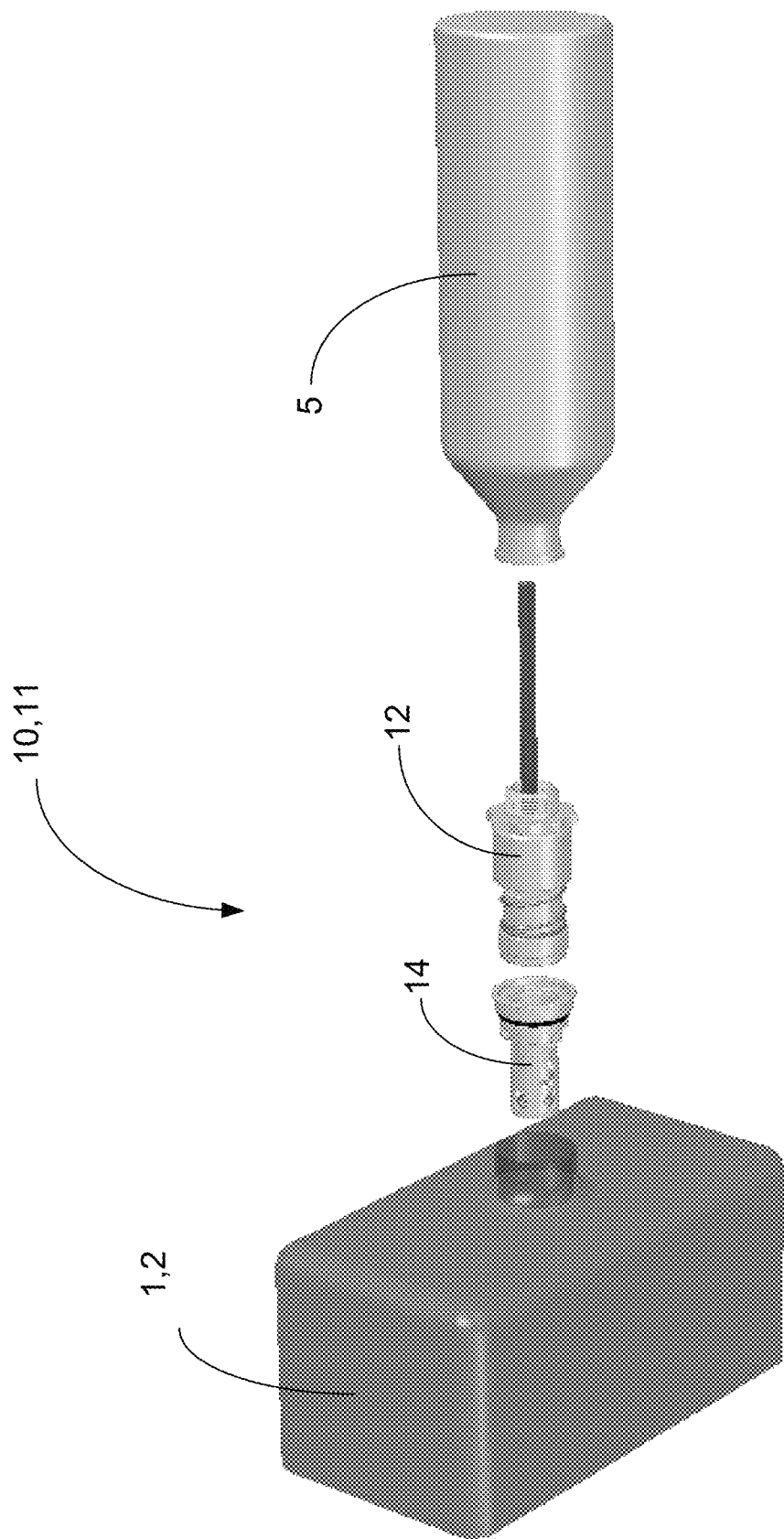
FIG. 1 shows an exploded view of the major elements of the present invention in use with the tank of a fueled device.
Figure 3:
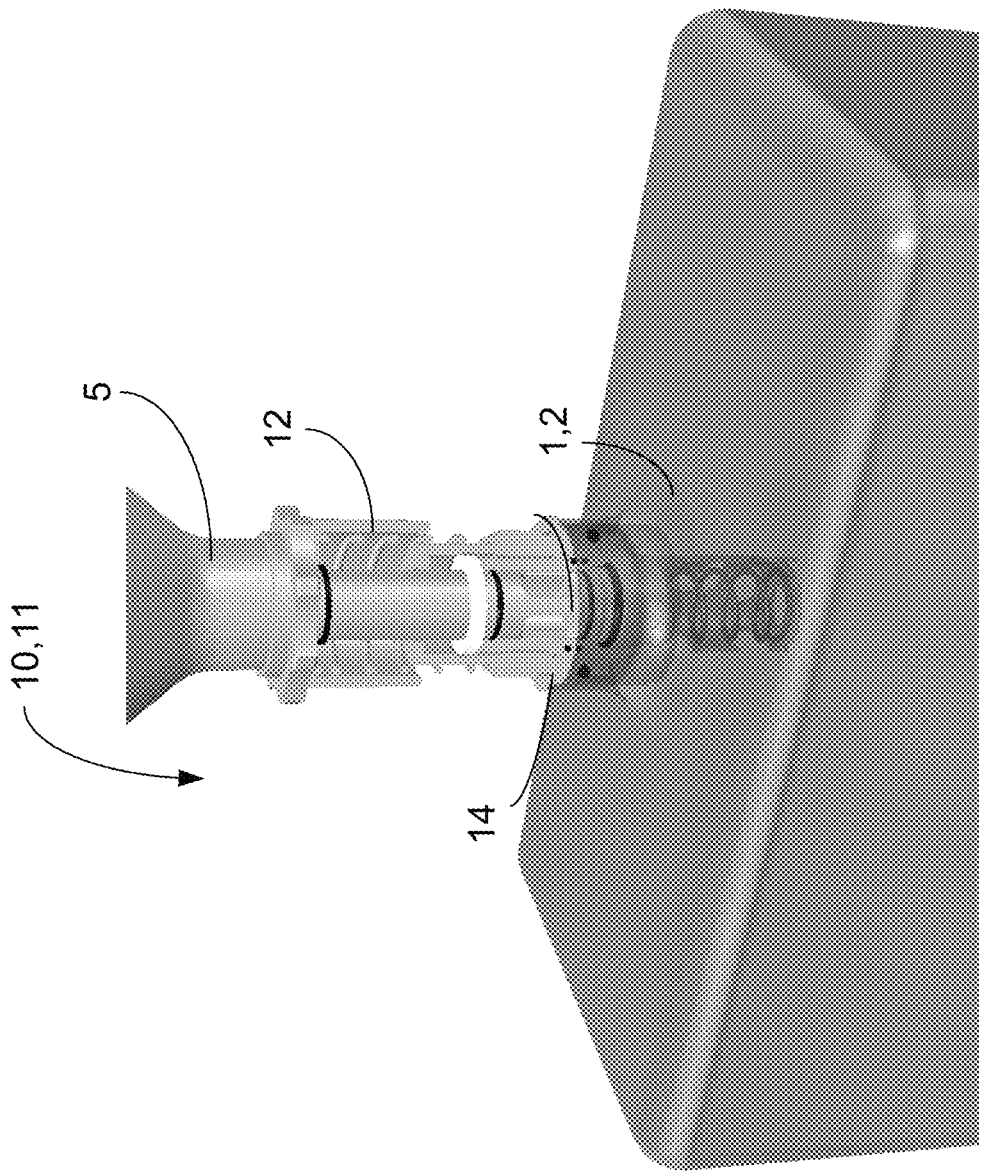
FIG. 3 shows a detailed view of the present invention in use with the tank of a fueled device.
Figure 2:
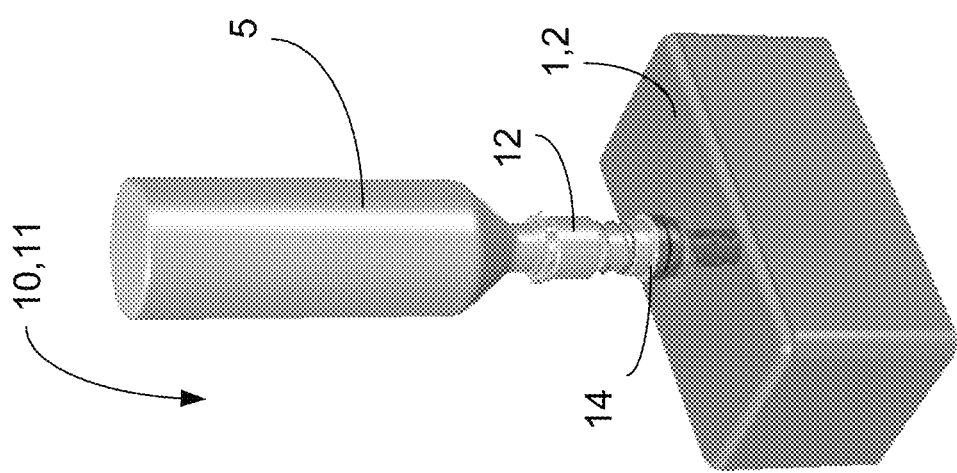
FIG. 2 shows the present invention in use with the tank of a fueled device.

The present invention is a volatile liquids refueling apparatus. It includes a probe 12 and a receiver 14, and together the overall apparatus will be referred to as the refueling apparatus 10. The present refueling apparatus 10 provides a vapor-tight enclosure 11, which allows the transfer of volatile liquids while containing any ignitable vapors The refueling apparatus 10 is designed to work with a fueled device, such as a chain saw (not shown), illustrated in FIG. 1, which may be in need of refueling during continuous operations, such as when being used to create fire breaks when fighting forest fires. The chain saw has a fuel tank 2 with an input port 3 which is closed with a cap (not shown). When in use, the receiver 14 replaces the cap on the fuel tank 2.

The probe 12 is attached or connected to a refueling source, such as a fuel bottle 5, which is typically a bottle or possible a hose that supplies fuel through the probe 12.

When in use, the probe 12 with attached fuel bottle 5 engages the receiver 14 which has been stationed in the tank 2 of the chain saw. The attachment of the probe 12 takes place in three basic stages, which are illustrated in FIGS. 6-8, and will be discussed in detail below.

Figure 4B:
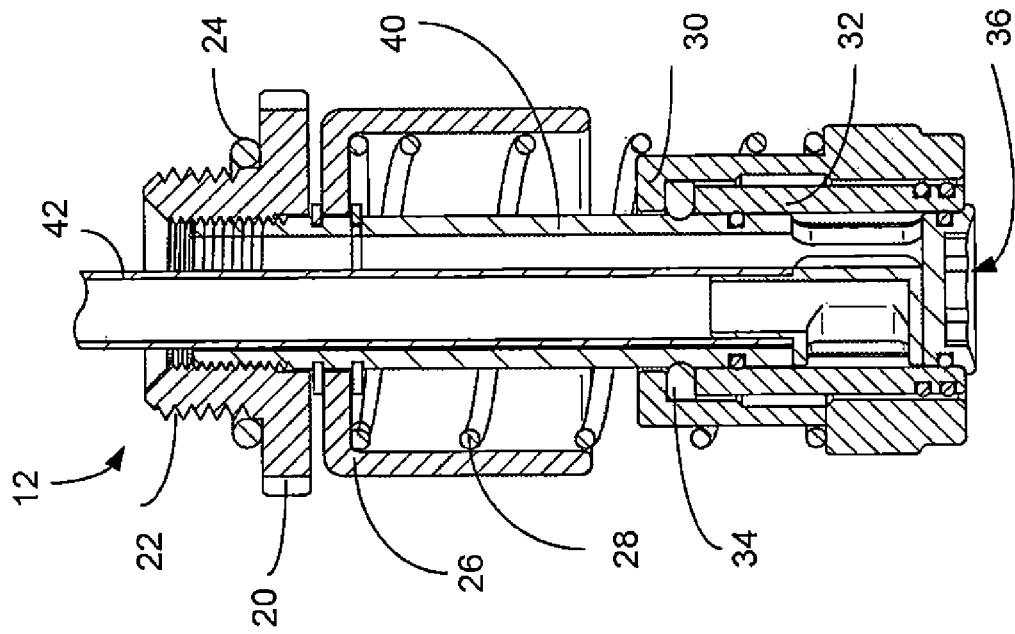
FIG. 4B shows a cut-away view of the probe of the present invention as taken through line B-B of FIG. 4A.
Figure 4A:
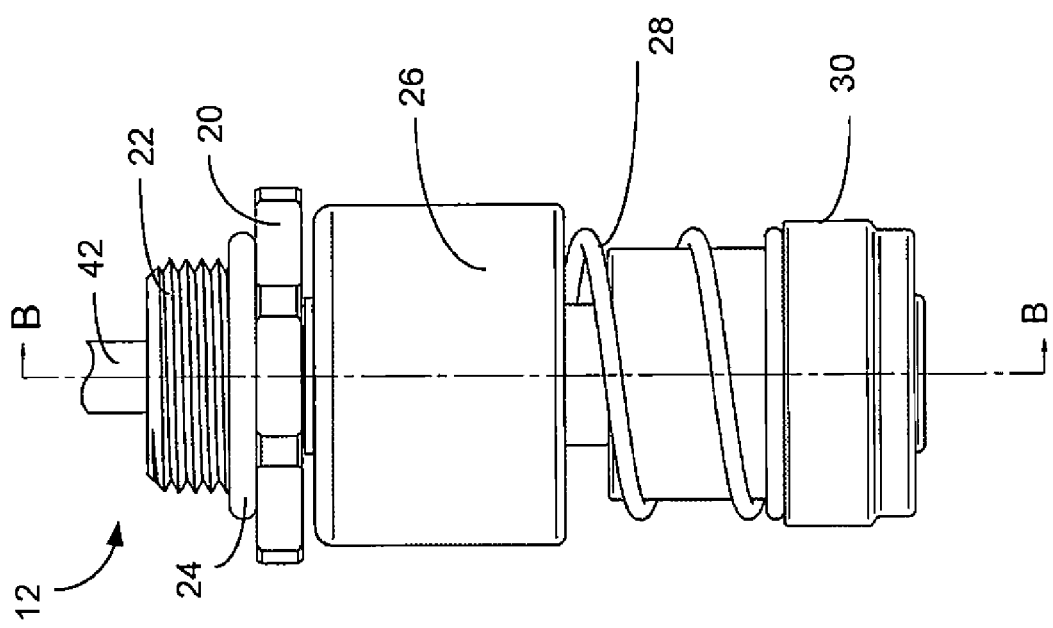
FIG. 4A shows a probe portion of the present invention.

The probe 12 is shown in FIG. 4A and in cross-section in FIG. 4B, which is taken from line A-A in FIG. 4A. Referring now to both FIGS. 4A and 4B, the probe 12 includes fuel bottle adaptor 20 having screw threads 22, an O-ring 24, spring cup 26, spring 28, outer collar 30, seal ring 32, slip ring 34 and aperture 36. Running through the middle of the structure is a central tube 40, which extends into the fuel bottle 5 (see FIG. 1) and directs fuel through the receiver 14 to the fuel tank 2.

The receiver 14 is shown in FIG. 5A and in cross-section in FIG. 5B, which is taken from line B-B in FIG. 5A. Referring now to both FIGS. 5A and 5B, the receiver 14 includes receiver collar 50, receiver aperture 52, O-ring 54, lower adapter 56, plunger 58, spring 60, lower spring plate 62 and receiver housing 64. Also included are a lock-down nut 66 and a lock down channel 68, which will be discussed in more detail below.

Figure 6:
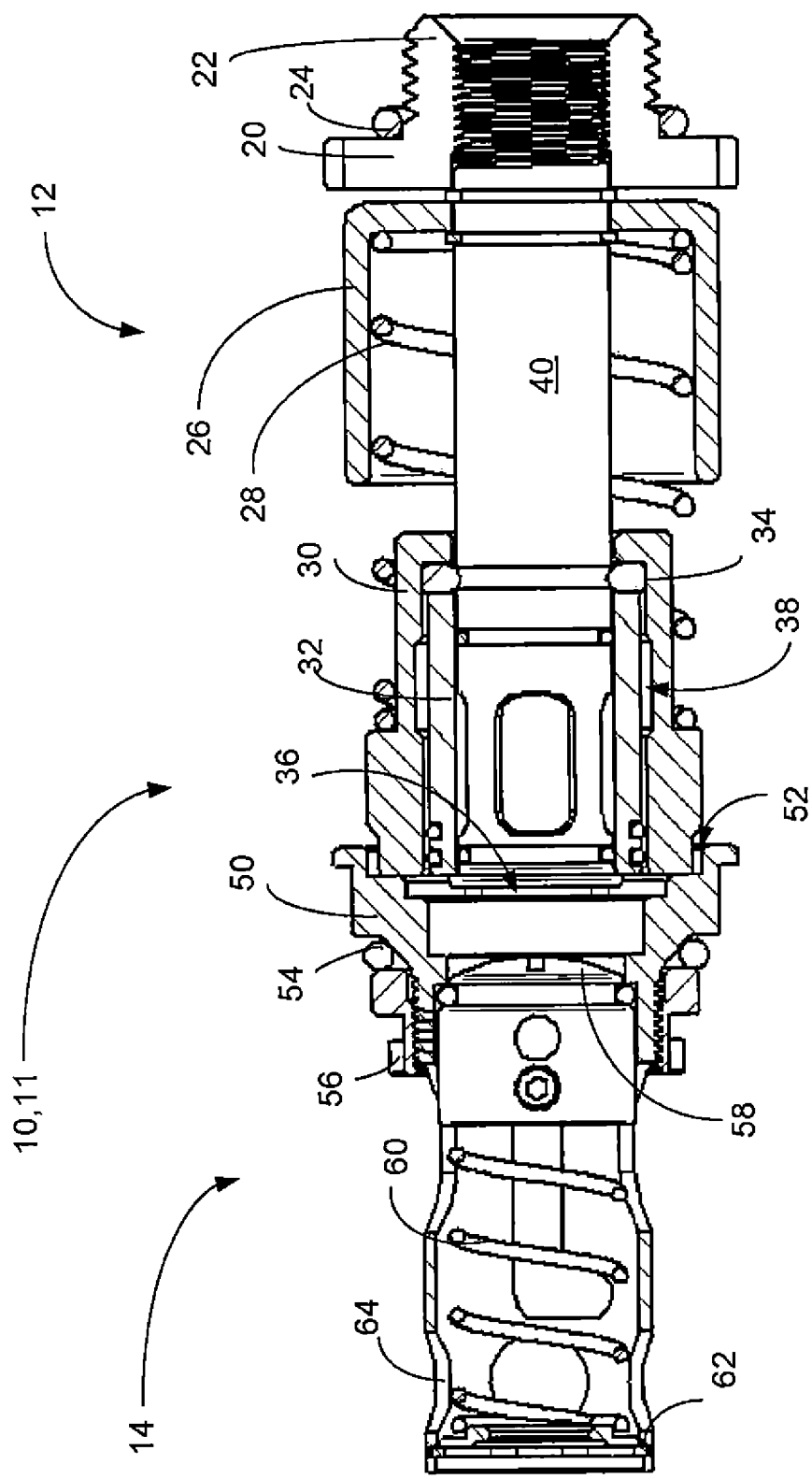
FIG. 6 shows a cut-away view of the apparatus of the present invention in the first stage of attachment.
Figure 7:
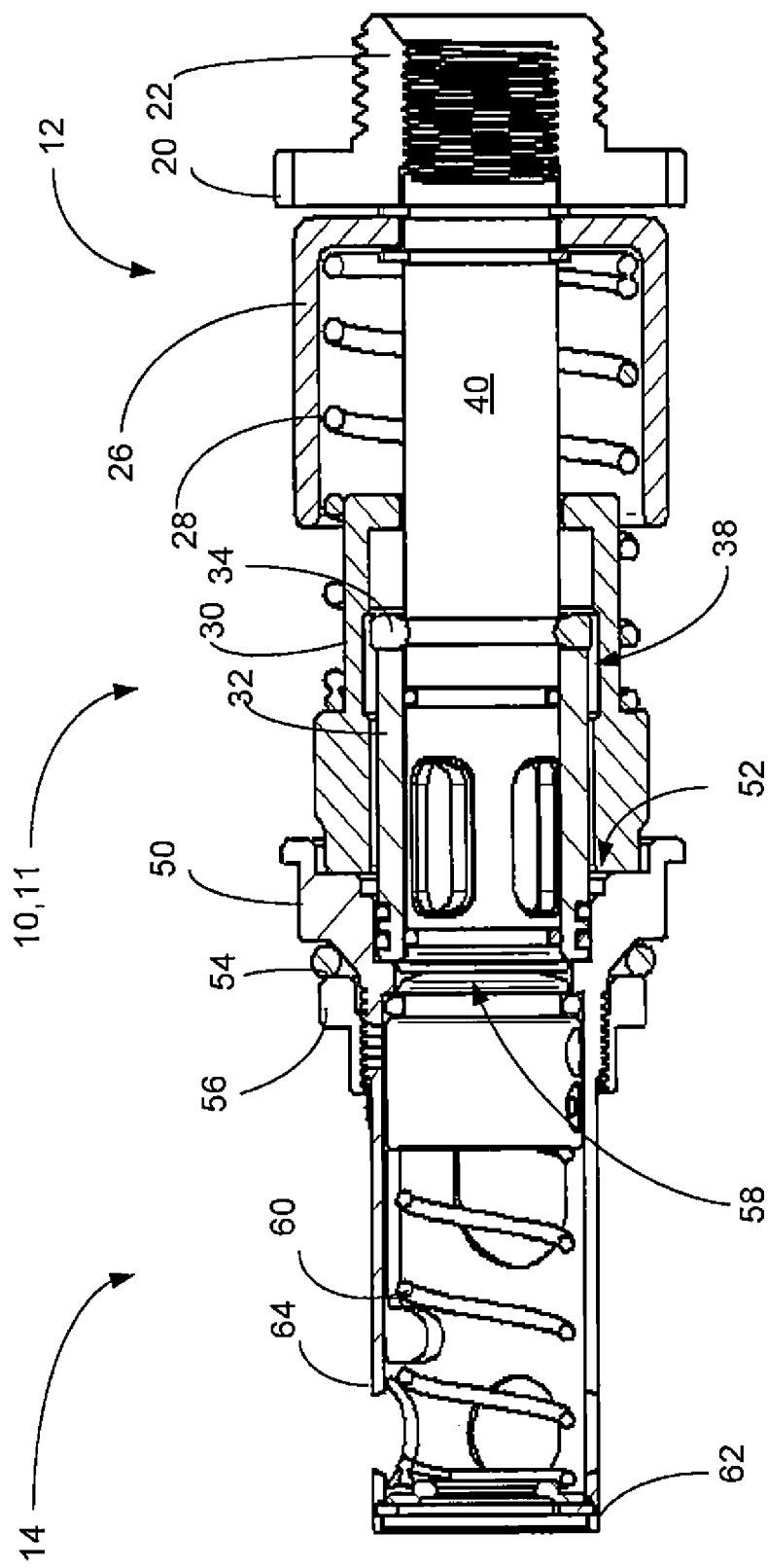
FIG. 7 shows a cut-away view of the apparatus of the present invention in the second stage of attachment.
Figure 8:
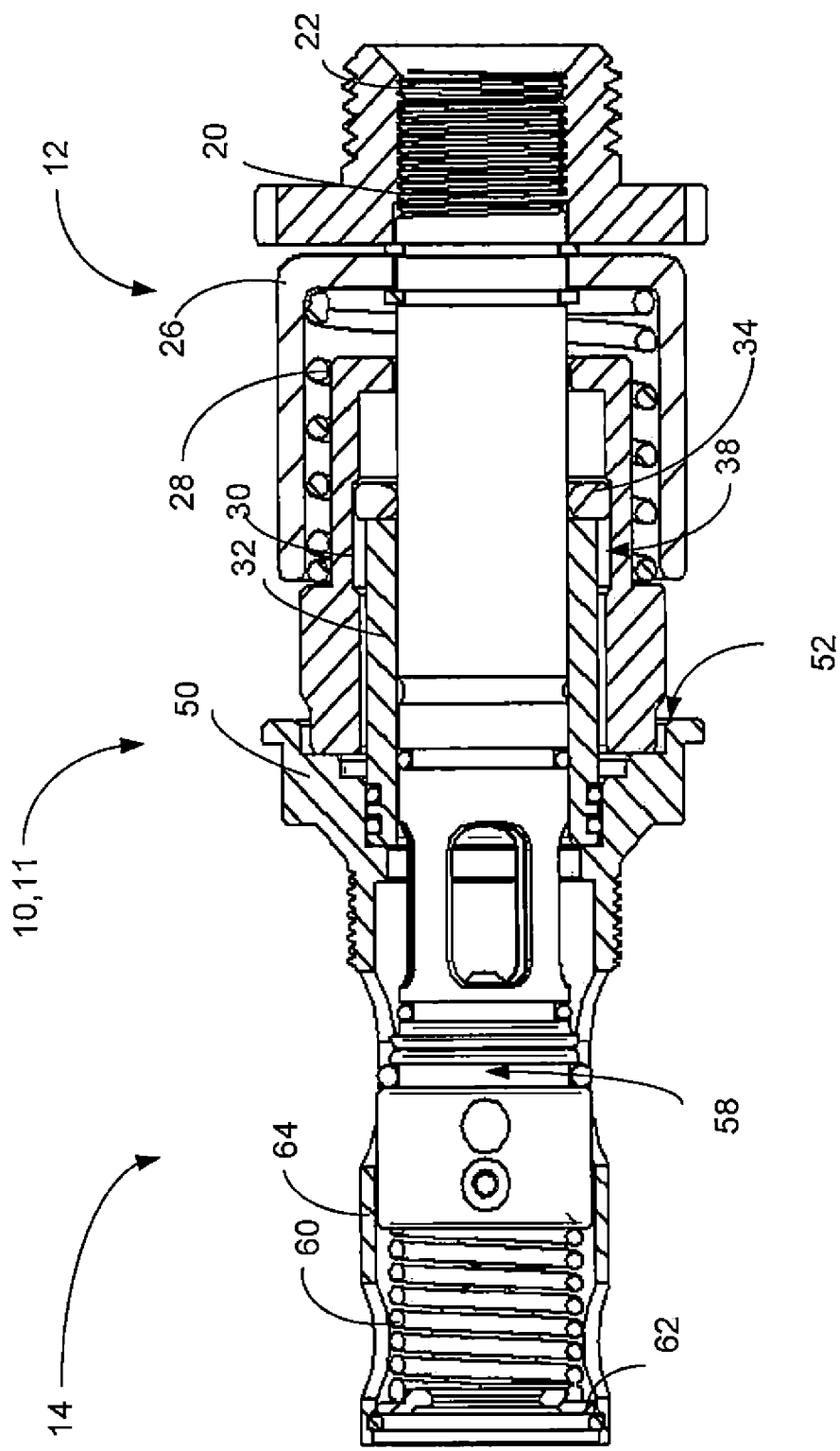
FIG. 8 shows a cut-away view of the apparatus of the present invention in the third stage of attachment.
Figure 10:
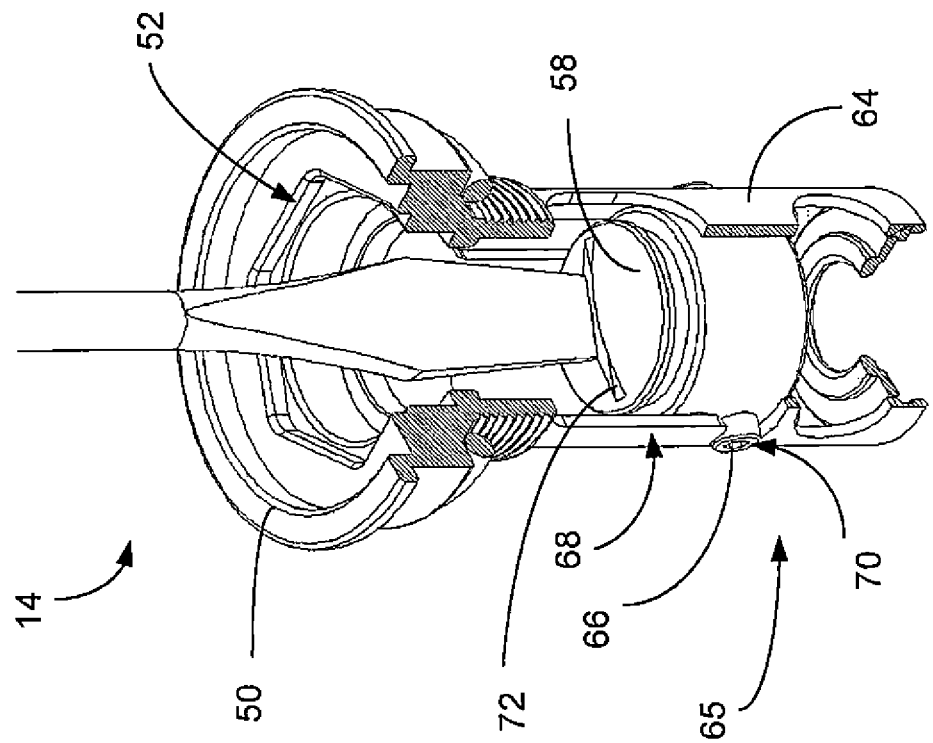
FIG. 10 shows an isometric view with cut-away of the receiver portion of the present apparatus engaged with a screwdriver to engage the lock-down mechanism.
Figure 9:
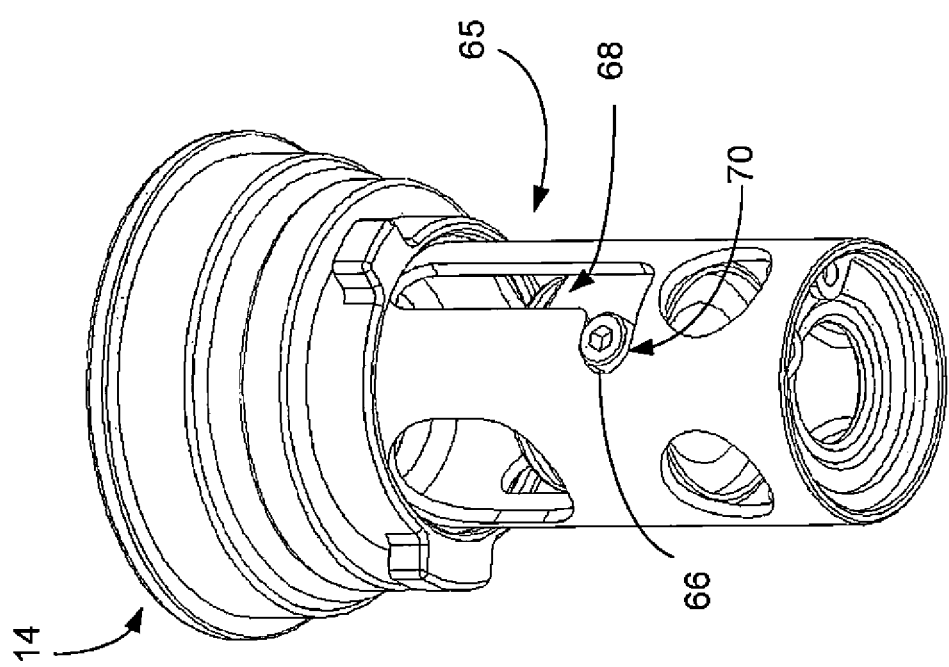
FIG. 9 shows an isometric view of the receiver portion of the present apparatus with the lock-down nut and channel.

FIGS. 6-8 show the three stages of attachment between the probe 12 and the receiver 14. It will be assumed that the receiver 14 has been secured onto the chain saw fuel tank 2 in place of the cap, using the lower adaptor 56. The receiver 14 is installed by removing the original cap, dropping the receiver 14 into the input port (see FIG. 1) and tightening it using the large hex end of a bar tool. The lower adaptor 56 and O-ring 54 configuration are made to fit the same as the original cap, and is preferably made almost entirely of 6061-T6 aluminum in order to keep weight to a minimum and improve durability. Also, vent tube 42, shown in FIG. 4A-B is not shown, but extends from within central tube 40 into the fuel bottle, also not shown, in order to allow vapors to vent from the saw's fuel tank.

The probe 12 is designed to seal against the receiver 14 and is activated in 3 separate stages. The probe 12 includes a slip ring 34, which allows the probe 12 to be extended in the correct order. This is a critical safety feature so that the probe 12 can only be extended if installed into the receiver 14. At no time can it be accidently opened during transportation or storage.

In Stage 1, shown in FIG. 6, the probe 12 is mated with the receiver 14 and is aligned as shown in FIGS. 6, 7, and 8. At this point the receiving aperture 52 and the aperture 36 are aligned. During this stage the slip ring 34 is still in the locked position.

In Stage 2, as seen in FIG. 7, the probe 12 is inserted into the receiver 14 and a seal is made between the seal ring 32 and the receiver 14. At this point the system is now in a sealed state and no vapors, pressure or fuel can escape into the atmosphere. In addition, the outer collar 30 is moved into position so that the slip ring 34 can be pushed up by the seal ring 32. During this stage no fuel has been exchanged.

In Stage 3, as shown in FIG. 8, the probe 12 is further inserted into the receiver 14. As the probe extends it makes contact with the plunger 58 and is pressed down breaking the seal with the upper lip on the receiving collar 50. At this point the seal is also broken between the central tube 40 and the seal ring 32 and allows fuel to flow and air to return though the vent tube 42.

This works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast, the present apparatus is sealed providing a vapor-tight compound enclosure 11. Once the fuel probe 12 and the fuel tank 2 are connected, fluid is simply exchanged from one to the other without back pressure to inhibit the flow.

As the probe 12 is retracted fuel stops flowing once the central tube 40 becomes fully retracted into the seal ring 32. At the same time the plunger 58 seal the fuel tank as it mates with the upper lip on the receiving collar 50. Finally the slip ring 34 is pushed back into the groove on the central tube 40 as illustrated in FIG. 7 and the seal is broken between the seal ring 38 and the receiving collar 50.

This method is discussed in more detail below.

An important feature of the present invention is that the apparatus of the present invention can be locked in the open position so the user can fill or empty the tank 2 without the use of the probe 12 if necessary, using a chainsaw bar tool or screwdriver.

Referring now to FIGS. 5A-B and FIGS. 9 and 10, a slot 72 in the top of the plunger 58 and a lock-down mechanism 65 allow the user to press the plunger 58 down with a bar tool or screw driver and turn it to lock it in an open position. The lock-down mechanism preferably includes a lock-down screw 66 which travels down a lock-down channel 68 and is turned into a side passage 70 by rotation of the screw slot 70, where the lock-down screw 66 is captured. This locks the plunger 58 in the down position so that the saw can be filled with a traditional fuel container.

A further embodiment of the present invention includes a dual locking receiver which can be locked in either an open position or a closed position. This is a safety feature that ensures that the receiver cannot be opened even if the probe is installed. Thus, in the case of an accident or during transport there is no possibility of the receiver being opened and fuel or vapor escaping. This feature is engaged again by inserting a screw driver or "bar tool" into the slot on the plunger and turning it 45 degrees.

Referring now to FIGS. 5A-B and FIGS. 11 through 14, a slot 72 in the top of the plunger 58 and a dual locking mechanism 75 allow the user to press the plunger 58 down with a bar tool or screw driver and turn it to lock it in can be locked in either an open position or a closed position.

Figure 12:
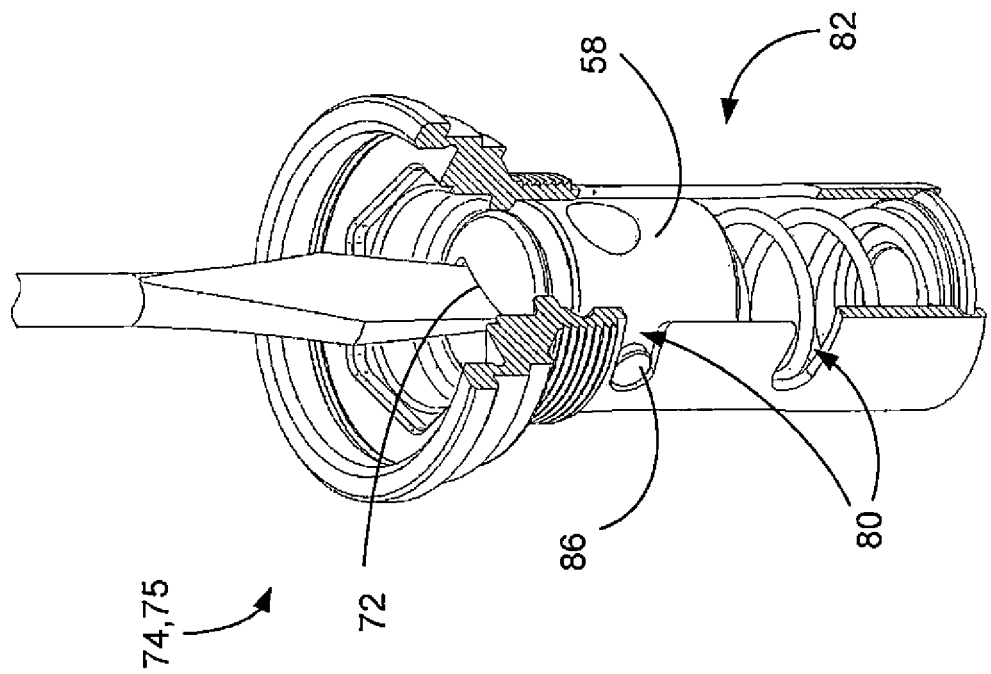
FIG. 12 shows an isometric view with cut-away of the receiver portion of the present apparatus which locks in both open and closed configurations engaged with a screwdriver to engage the dual locking mechanism in the lock closed position.
Figure 11:
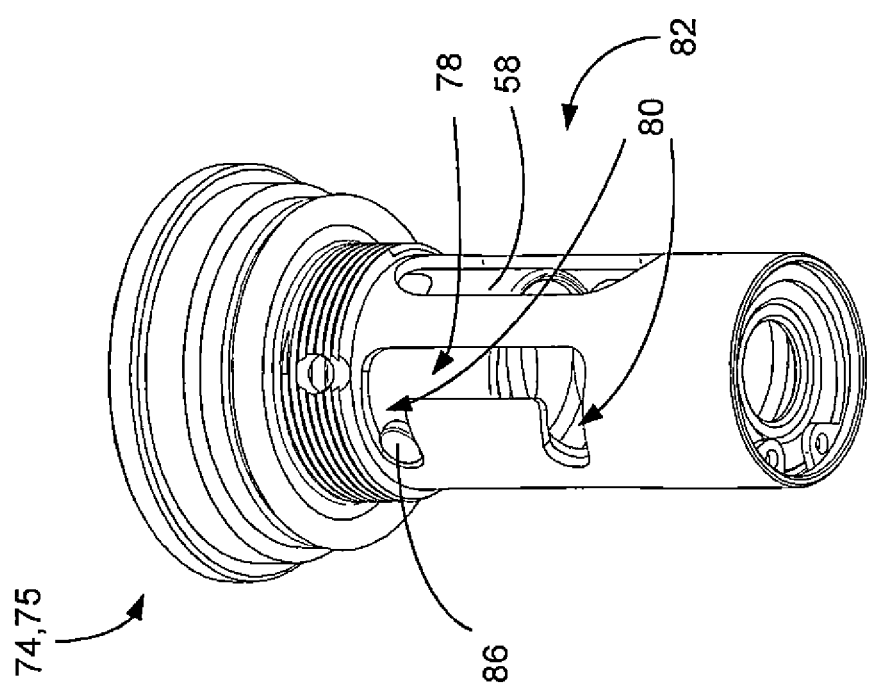
FIG. 11 shows an isometric view of the receiver portion of the present apparatus with the lock-down nut and channel which locks in both open and closed configurations, which is positioned in the lock closed position.

In FIGS. 11 and 12, the duel locking receiver 74 is shown in the locked closed position 82. The dual locking mechanism 75 preferably includes a lock-down protrusion 86, which could be a screw or pin, which travels down a duel locking channel 78 and is turned into one of two duel side passages 80 by rotation of the screw slot 72, where the lock-down screw 66 is captured. This locks the plunger 58 in the locked closed 82 position so that the saw can be transported without fear of leakage or spillage.

Figure 14:
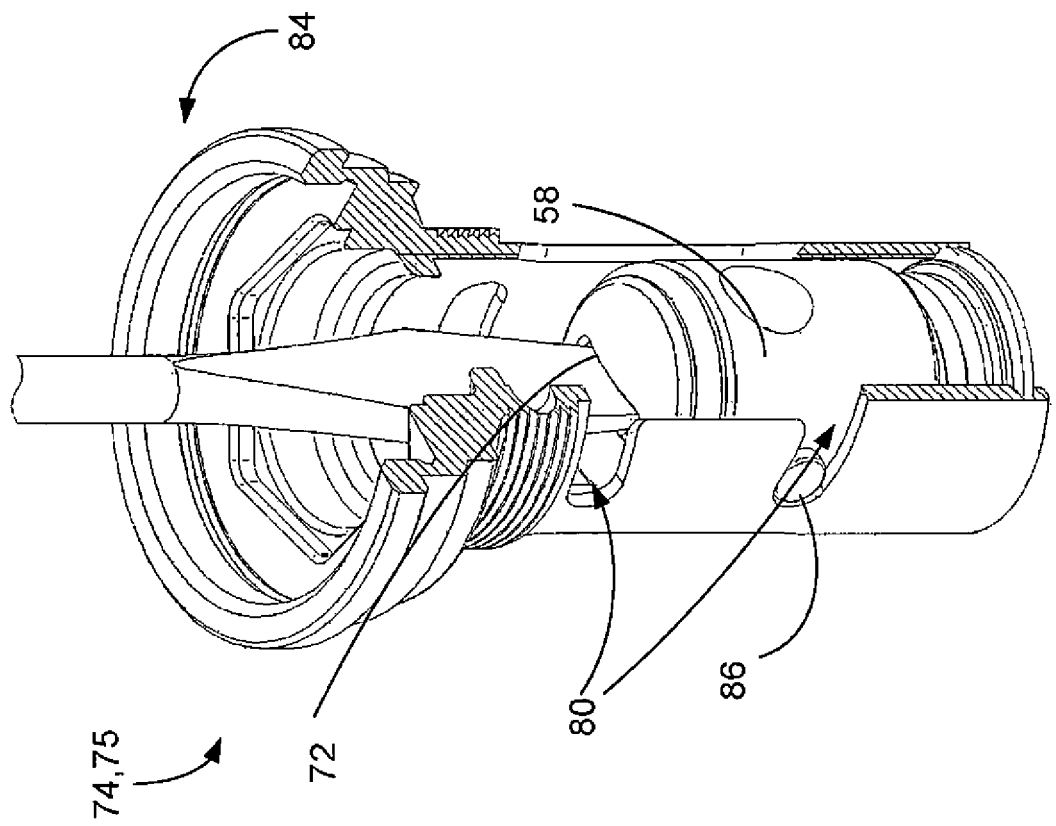
FIG. 14 shows an isometric view with cut-away of the receiver portion of the present apparatus which locks in both open and closed configurations engaged with a screwdriver to engage the dual locking mechanism in the lock open position.
Figure 13:
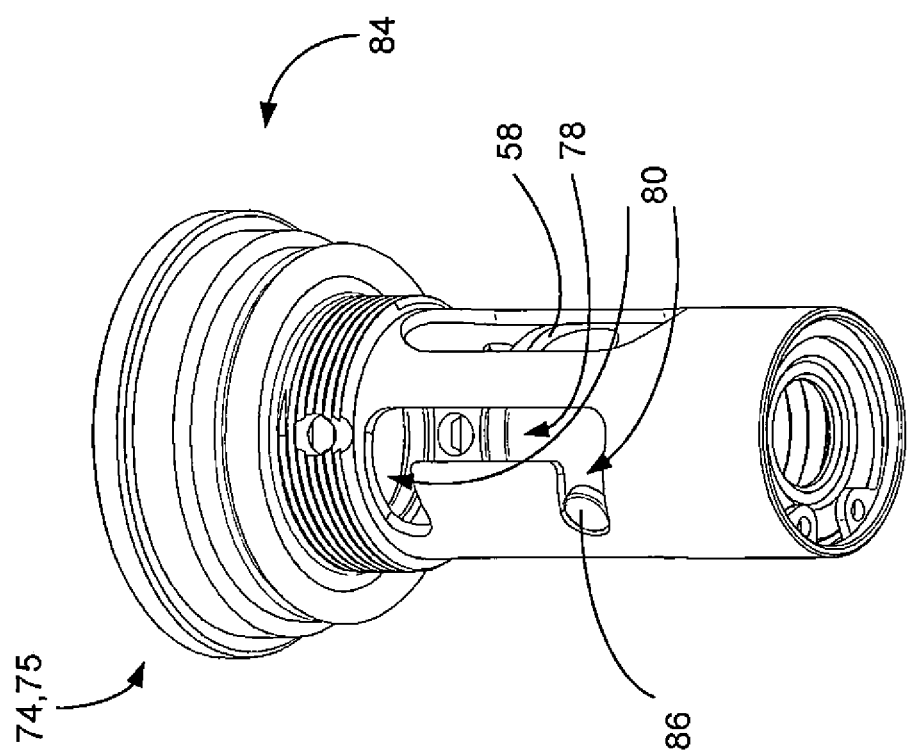
FIG. 13 shows an isometric view of the receiver portion of the present apparatus with the lock-down nut and channel which locks in both open and closed configurations, which is positioned in the lock open position.

In FIGS. 13 and 14, the dual locking receiver 74 is shown in the locked open position 84. The dual locking mechanism 75 preferably includes a lock-down protrusion 86, which could be a screw or pin, which travels down a dual locking channel 78 and is turned into one of two dual side passages 80 by rotation of the screw slot 72, where the locking screw 66 is captured. This locks the plunger 58 in the locked open 84 position so that the saw can be filled with a traditional fuel container.

The threaded adaptor 20 allows the present apparatus to be installed by hand (no tools needed) onto a standard fuel (SIG) bottle.

Figure 15:
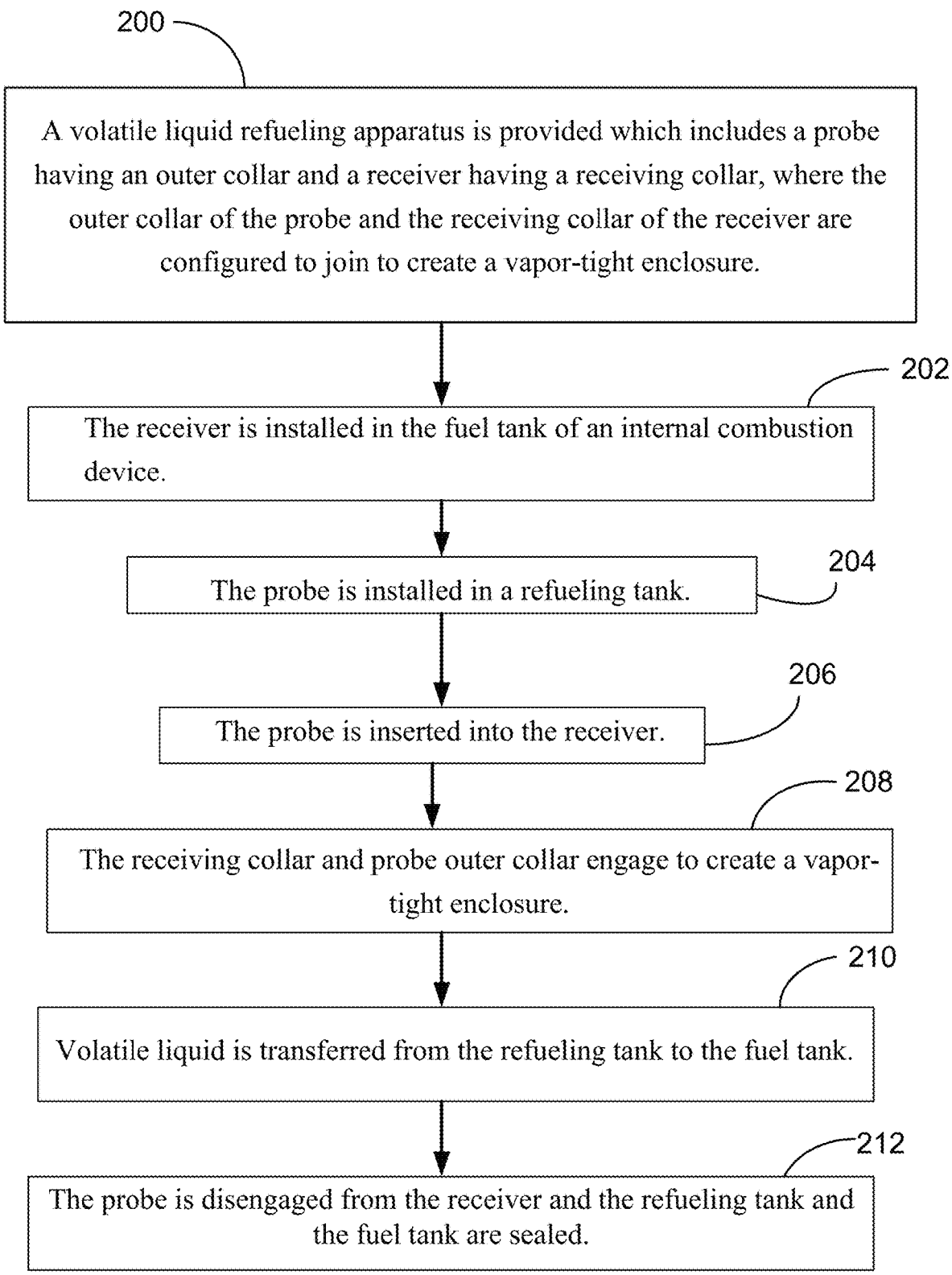
FIG. 15 shows a flow chart of the method of the present invention in detail.

As referenced above, there is an inventive method for using the apparatus which is discussed above. This same method will now be discussed in more detail, but using the same method which is outlined previously, using the same apparatus discussed above. This method is represented graphically in the flowchart of FIG. 15. The method includes the following steps:

A volatile liquid refueling apparatus is provided which includes a probe having an outer collar and a receiver having a receiving collar, where the outer collar of the probe and the receiving collar of the receiver are configured to join to create a vapor-tight enclosure. 200

The receiver is installed in the fuel tank of an internal combustion device. 202

The probe is installed in a refueling tank. 204

The probe is inserted into the receiver. 206

The receiving collar and probe outer collar engage to create a vapor-tight enclosure. 208

Volatile liquid is transferred from the refueling tank to the fuel tank. 210

The probe is disengaged from the receiver and the refueling tank and the fuel tank are sealed. 212

There are further details that can be included within these basic steps. It can be included that the apparatus has a locking mechanism. This locking mechanism can include a locking nut and a dual locking channel having two side passages. The locking mechanism can include a dual-locking mechanism which can be locked in either an open or a closed position. The probe can include a seal ring and a central tube. The receiver can include a plunger which can open the seals to open the fluid passage. These details are disclosed in the discussion of the apparatus above and were included in the parent applications to which priority is claimed. No new matter has been added.

While various embodiments have been described above, it should be understood that they have been presented by way of example only, and not limitation.

What is claimed is:

1. A method for transferring volatile liquid from a refueling tank to the fuel tank of an internal combustion device comprising the steps of:
   A) providing a volatile liquid refueling apparatus, comprising:
      a probe including an outer collar; and
      a receiver including a receiving collar, where said outer collar of said probe and said receiving collar of said receiver are configured to join to create a vapor-tight enclosure;
   B) installing said receiver in said fuel tank of said internal combustion device:
   C) installing said probe in said refueling tank;
   D) inserting said probe into said receiver;
   E) engaging said receiving collar and said probe outer collar to create a vapor-tight enclosure;
   F) transferring said volatile liquid from said refueling tank to said fuel tank; and disengaging said probe from said receiver, including sealing said refueling tank and said tank wherein said receiver of said volatile liquid refueling apparatus includes a receiver housing which is configured with a locking mechanism comprising a locking nut and dual locking channel including two side passages.

2. The method of claim 1, wherein:
said locking mechanism comprises a dual locking mechanism whereby said apparatus can be locked in either an open position or a closed position.

3. A method for transferring volatile liquid from a refueling tank to the fuel tank of an internal combustion device comprising:
   A) providing a volatile liquid refueling apparatus, comprising:
      a probe including a seal ring and central tube; and
      a receiver including a receiving collar and plunger, where said seal ring of said probe and said receiving collar of said receiver are configured to join to create a vapor-tight enclosure, said receiver of said volatile liquid refueling apparatus includes a receiver housing which is configured with a locking mechanism, said locking mechanism comprises a locking nut and dual locking channel including two side passages;
   B) installing said receiver in said fuel tank of said internal combustion device:
   C) installing said probe in said refueling tank;
   D) aligning and inserting said probe into said receiver;
   E) engaging said seal ring of said probe and said receiver collar to create a vapor-tight seal between said central tube and said seal ring, further inserting said probe to make contact with said receiver plunger to break the seal with said receiving collar and the seal between said central tube and said seal ring;
   F) transferring fuel between said refueling tank and said tank of said internal combustion device;
   G) retracting said probe from said receiver and resealing said seals in said refueling tank and said tank of said internal combustion device.

4. The method of claim 3, wherein:
said locking mechanism comprises a dual locking mechanism whereby said apparatus can be locked in either an open position or a closed position.

* * * * *